(12) United States Patent
Madan

(10) Patent No.: US 12,102,500 B1
(45) Date of Patent: Oct. 1, 2024

(54) ORTHODONTIC ALIGNER REMOVAL DEVICE AND METHOD

(71) Applicant: Rohit Madan, Saar (BH)

(72) Inventor: Rohit Madan, Saar (BH)

(*) Notice: Subject to any disclaimer, the term of this patent is extended or adjusted under 35 U.S.C. 154(b) by 0 days.

(21) Appl. No.: 18/593,890

(22) Filed: Mar. 2, 2024

(51) Int. Cl.
*A61C 7/02* (2006.01)
*A61C 7/04* (2006.01)

(52) U.S. Cl.
CPC .............. *A61C 7/023* (2013.01); *A61C 7/04* (2013.01)

(58) Field of Classification Search
CPC .. A61C 7/023; A61C 7/04; A61C 7/06; A61C 7/00; A61B 2018/1462; A61B 2017/305; A61B 2017/306; A61B 2017/308; A61B 2017/505; A61B 17/50; A61B 17/30; B25B 7/00; B25B 7/02; B25B 7/05; B25B 7/22; B25B 9/02
USPC ................................................ 81/419, 419.5
See application file for complete search history.

(56) References Cited

U.S. PATENT DOCUMENTS

| | | | | |
|---|---|---|---|---|
| 6,382,965 | B1* | 5/2002 | Ruiz-Vela | A61C 7/02 433/4 |
| 7,011,517 | B2* | 3/2006 | Nicozisis | A61C 7/02 433/141 |
| 10,307,223 | B1* | 6/2019 | Aronson | A61C 7/023 |
| 11,857,388 | B1* | 1/2024 | Chong | A61C 7/023 |
| 2008/0160473 | A1* | 7/2008 | Li | A61C 7/08 433/3 |
| 2012/0189970 | A1* | 7/2012 | DeSanti | A61C 7/02 433/3 |
| 2013/0033269 | A1* | 2/2013 | He | G01R 31/74 324/550 |
| 2020/0038141 | A1* | 2/2020 | Crouse | A61C 7/08 |
| 2021/0186660 | A1* | 6/2021 | Dayan | A61C 7/02 |
| 2022/0218442 | A1* | 7/2022 | Scherr | A61C 7/02 |

* cited by examiner

*Primary Examiner* — Jacqueline T Johanas
*Assistant Examiner* — Drew S Folgmann
(74) *Attorney, Agent, or Firm* — Alexander Postnikov

(57) ABSTRACT

A device for removing orthodontic aligners. The device comprises a hinge mechanism that enables a tweezing motion, allowing a wearer to grasp an orthodontic aligner in between two contact regions precisely and easily. Tips and extensions extending from these contact regions ensure comprehensive contact with aligner ridges and bases, while central segments in between them, possibly with textured surfaces, enhance grip. The device's design, including tips having sloped segments, guide the aligner ridges into the tips, ensures a snug fit. Variations include acute or obtuse angles between extensions and central segments for effective aligner positioning, and textured leg surfaces for improved user grip.

18 Claims, 9 Drawing Sheets

ORTHODONTIC ALIGNER REMOVAL DEVICE AND METHOD

BACKGROUND

Field of the Invention

The invention relates generally to orthodontics, and, more particularly, to a device and method for removing an orthodontic aligner.

Scope of the Prior Art

Orthodontic aligners often have such an exact fit over a wearer's teeth that it becomes difficult remove the aligners with only fingers. In response, many one-prong aligner removal tools have been marketed to help wearers remove their aligners safely and easily. Despite their simplicity, these one-prong aligner removal tools come with many drawbacks.

One-prong aligner removal tools are less stable: A one-prong tool may offer less stability and control when removing an orthodontic retainer.

One-prong aligner removal tools are more difficult to use: With only one point of contact, it might be more challenging to get a good grip on the retainer for removal. This can make the process more cumbersome, especially for users with limited dexterity or those new to wearing retainers.

One-prong aligner removal tools result in a higher risk of damage: Using a one-prong tool might increase the risk of damaging the aligner or the tool itself. The uneven force applied can stress the material of the retainer, potentially leading to cracks or breaks over time.

One-prong aligner removal tools are less precise: A one-prong tool may not provide the same level of precision, potentially leading to repeated attempts and frustration.

One-prong aligner tools are less comfortable: The lack of stability and increased difficulty in removing the aligner with a one-prong tool may cause discomfort or pain, especially if the retainer or tool slips during the attempt.

One-prong aligner tools are less efficient: A one-prong tool might require more time and effort to successfully remove the aligner compared to a two-prong tool, making the process less efficient and potentially more tedious for the user.

One-prong aligner tools are more prone to misuse: The simplicity of a one-prong tool doesn't necessarily make it easier for all users. Without the right technique, there's a higher chance of misuse, which could lead to the aligner not being fully disengaged from the teeth or causing unnecessary pressure on the teeth or gums.

One-prong aligner tools can only be used to remove an aligner. They cannot be used to put the aligner back on.

What is needed is a two-prong aligner removal tool. The tool distributes downwards forces more evenly, advantageously reducing the risk of uneven pressure that could lead to breakage or discomfort during removal. Being a one-handed tool, wearers can manipulate the aligner without using their other hand to stabilize the aligner, reducing the risk of contaminating the aligner. Strategically placed recesses in the tool allow for more precise manipulation and make it easier to hook onto specific parts of the aligner for a safer and more controlled removal. The tool allows wearers to grab an aligner when the aligner is in its container or cleaner. The aligner can then be put back on.

SUMMARY

One aspect of the present invention is directed to a device for the removal of orthodontic aligners, facilitating a unique approach through its structural and functional characteristics. Central to this invention is a hinge mechanism that enables a tweezing motion, effectively allowing the device to grasp and release orthodontic aligners with precision and ease. This device comprises two legs interconnected by a hinge. Each leg terminates in a contact region that secures the orthodontic aligner during the removal process.

A set of tips and extensions extend from the distal and proximal ends of the contact regions, respectively. These elements are configured to contact both the inner and outer ridges, as well as the base of the orthodontic aligner, ensuring comprehensive contact. The central segments located between the tips and extensions are designed to contact the inner and outer walls of the aligner, with certain embodiments featuring flat or textured inner surfaces to enhance grip and stability.

A notable feature of the invention is the precise distance between the tips and extensions, which equals the height of the orthodontic aligner, ensuring a snug and secure fit. Additionally, the tips are equipped with recessed areas and sloped segments, strategically designed to guide aligner ridges into these recesses.

In some embodiments, the angles between the extensions and the central segments' inner surfaces are either acute or obtuse. This variation affects how the orthodontic aligner is pushed into position, either towards the recessed areas in the tips or by another method, to ensure a secure hold.

In some embodiments, the outer surfaces of the first and second legs are textured to provide a better grip for the user, while the central segments may also feature recessed areas adjacent to the tips for improved functionality.

A second aspect of the present invention is directed at a method of removing an orthodontic aligner: The outer and inner contact regions are caused to move apart from each other; the outer and inner contact regions are around the orthodontic aligner; the outer and inner contact regions are caused to approach each other, securing the aligner for removal; dislodging the aligner from a wearer's teeth; placing the aligner in a container or cleaner for aligners. This process benefits from the device's design, which ensures that the aligner is gripped firmly and uniformly, minimizing the risk of damage or discomfort during removal.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIG. 1a is a side view of a device to remove orthodontic aligners, where the device is in a closed configuration.

FIG. 1b is a front view of the device of FIG. 1a.

FIG. 3 is an enlarged view of the contact regions of the device of FIG. 1a.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while embodiments described herein are primarily discussed in the context of devices and methods to remove orthodontic aligners, it will be recognized by those of ordinary skill that the present disclosure is not so limited. In fact, the principles of the present disclosure described herein may be readily applied to other orthodontic procedures.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figures 1A, 1B:
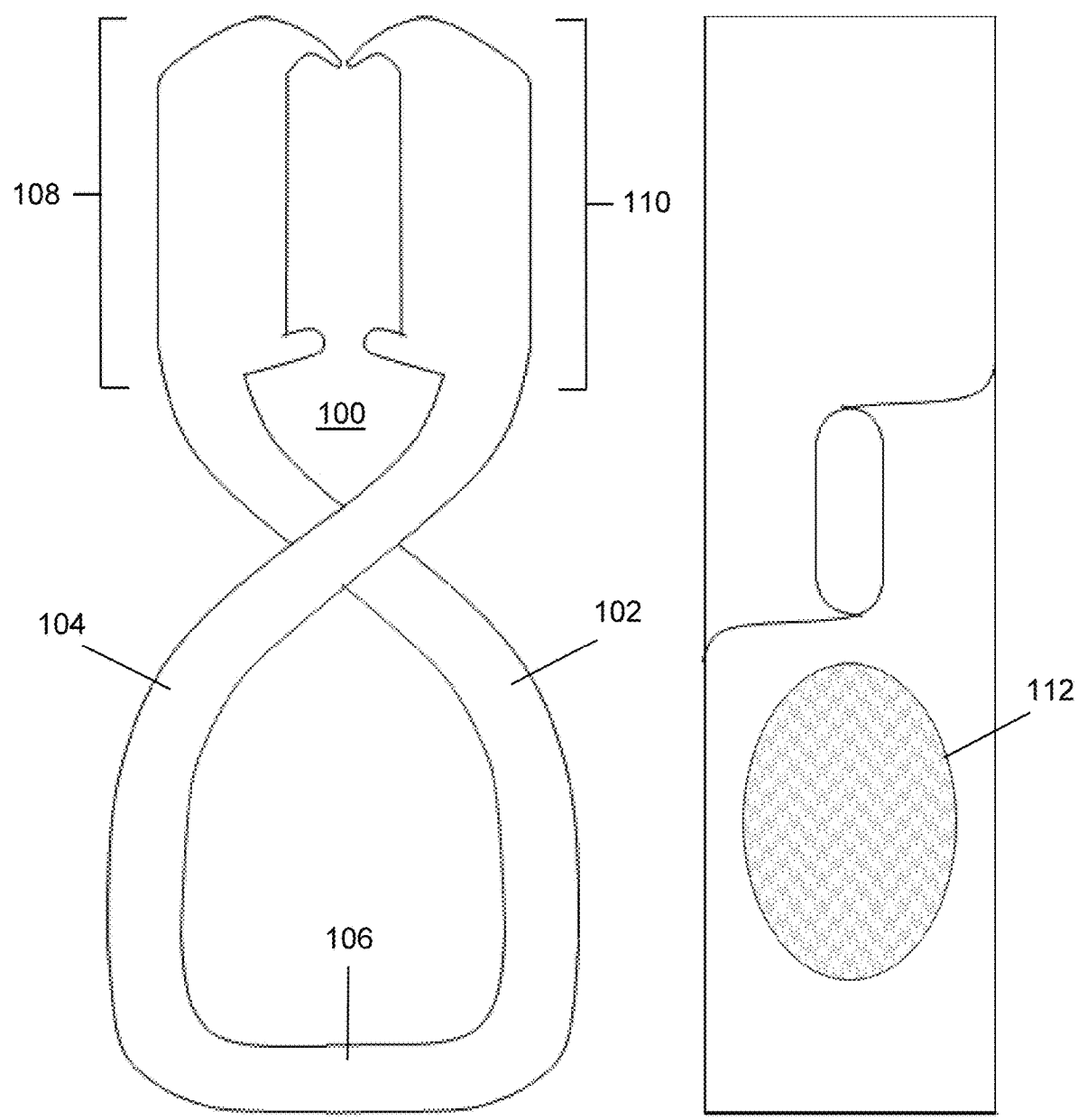

FIGS. 1a-1b show a device 100 to remove orthodontic aligners, where the device is in a closed configuration, according to one embodiment. Namely, FIG. 1a shows the device 100 from a side view and FIG. 1b shows the device 100 from a front view.

The device 100 may comprise a first leg 102 and a second leg 104. Preferably, proximal ends of the first 102 and second 104 legs are connected to each other to form a living hinge 106. The living hinge 106 can bend, allowing the device 100 to switch between open and closed configurations. Polypropylene or other pliable materials may be used for the living hinge 106 such that the device 100 maintains its overall shape and integrity after bending. The living hinge 106 may be made from the same material as first 102 and second 104 legs, advantageously allowing the device 100 to be manufactured in a single molding process, reducing production costs and complexity.

In an alternative embodiment, the first 102 and second 104 legs are coupled to each other using a torsion spring.

The device 100 may function as a self-closing tweezer such that the device 100 is in its closed configuration when no inwards forces are applied to the first 102 and second 104 legs. Preferably, the first 108 and second 110 contact regions are separated by a small gap when the device 100 is in its closed configuration.

The self-closing nature of the device 100 results in outer 108 and inner 110 contact regions that apply a consistent inwards pressure on a secured orthodontic aligner when the device 100 is in its closed configuration. Not relying on the wearer to keep the device 100 in a closed configuration mitigates unintentional damage to the orthodontic aligner as a result of too much inwards pressure. Furthermore, a wearer cannot accidentally drop the orthodontic aligner by momentarily letting go of the first 102 and second 104 legs.

In an alternative embodiment, the first leg 102, the second leg 104, and the hinge 106 are arranged in such a manner that the device 100 is in its open configuration when no inwards forces are applied to the first 102 and second 104 legs.

Distal ends of the first 102 and second 104 legs may comprise respective outer 108 and inner 110 contact regions. When the outer 108 and inner 110 contact regions are caused to approach each other, an orthodontic retainer is secured in between the inner surfaces of the outer 108 and inner 110 contact regions.

A portion 112 of the outer surfaces of the first 102 and second 104 legs may be textured to improve grip. The portion 112 may be an entire portion. Preferred textures include checkered patterns, ribs, grooves, and dotted textures. Alternatively, rubber or silicone grips may be integrated into the first 102 and second 104 legs.

Figure 2:
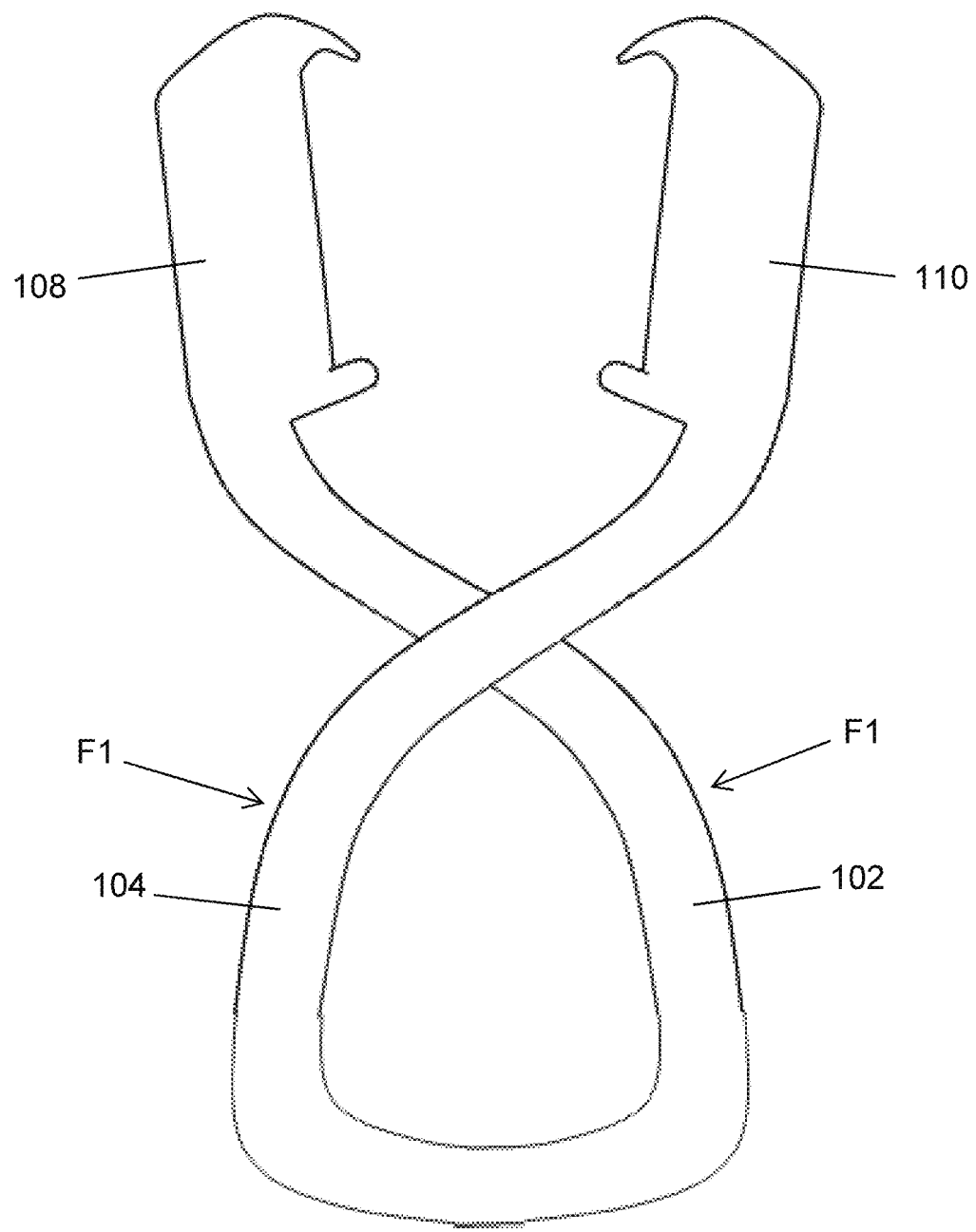
FIG. 2 is a side view of the device of FIG. 1a, where the device is in an open configuration.

FIG. 2 is a side view of the device 100, where the device is in an open configuration, according to an embodiment.

Applying an inward forces F1 to the first 102 and second 104 legs causes the outer 108 and inner 110 contact regions to move apart from each other. Preferably, the outer 108 and inner 110 contact regions are separated by a large gap when the device 100 is in its open configuration. The large gap should be wide enough to enable a user to position the outer 108 and inner 100 contact regions around the width of an orthodontic aligner.

In an alternative embodiment, the first leg 102, the second leg 104, and the hinge 106 are arranged in such a manner that the device 100 is in its closed configuration when no inwards forces are applied to the first 102 and second 104 legs.

Figure 3:
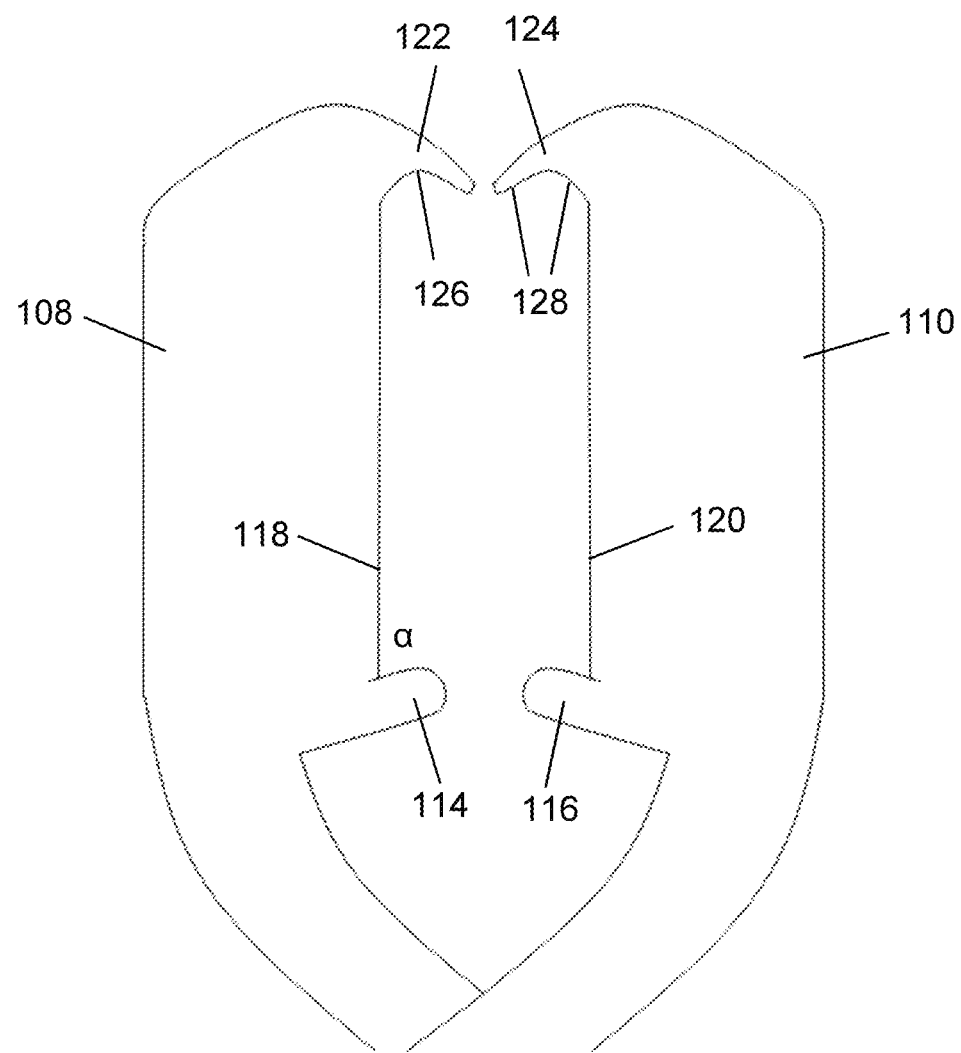

FIG. 3 is an enlarged view of the outer 108 and inner 110 contact regions of the device 100, according to an embodiment. The outer contact region 108 may comprise an outer extension 114, an outer central segment 118, and an outer tip 122 while the inner contact region 110 may comprise an inner extension 116, an inner central segment 120, and an inner tip 124.

The outer 114 and inner 116 extensions extend out of proximal ends of the outer 108 and inner 110 contact regions. The outer 114 and inner 116 extensions face each other and are configured to contact the base of the orthodontic aligner. The angle (a) between inner surfaces of the outer 114 and inner 116 extensions, and inner surfaces of the respective outer 118 and inner 120 central segments, may be acute, preferably 40-80 degrees.

The outer 122 and inner 124 tips extend out of distal ends of the outer 108 and inner 110 contact regions. The outer 122 and inner 124 tips face each other and are configured to contact outer 140 and inner 142 ridges of the orthodontic aligner.

In a preferred embodiment, inner surfaces of the outer 122 and inner 124 tips have recessed areas 126. When the outer 140 and inner 142 ridges of the orthodontic aligner are positioned inside of the recessed areas, forwards and backwards motion of the orthodontic aligner is further restricted. Curvatures of the inner surfaces include sloped segments 128 configured to guide the outer 140 and inner 142 ridges of the orthodontic aligner into the recessed areas 126 during the process of securing the orthodontic aligner in between the outer 108 and inner 110 contact regions.

Alternatively, curvatures of the inner surfaces of the outer 122 and inner 124 tips include only one sloped segment configured to guide the outer 140 and inner 142 ridges of the orthodontic aligner into the recessed areas 126.

The outer 118 and inner 120 central segments are located in between the outer 114 and inner 116 extensions, and the outer 122 and inner 124 tips. The outer 118 and inner 120 central segments face each other and are configured to contact outer 136 and inner 138 walls of the orthodontic retainer.

Preferably, a distance between the tips and the extensions is slightly greater than the height of a corresponding orthodontic aligner. This allows the outer 108 and inner 110 contact regions to readily receive the orthodontic aligner while keeping it secure when the device 100 is in its fully closed configuration. Alternatively, the distance between the tips and the extensions is equal to the height of the orthodontic aligner. This increases the snugness of the fit. Yet alternatively, the distance between the tips and the extensions is slightly smaller than the height of the orthodontic aligner. This ensures that the orthodontic retainer will not fall out of the device 100 once it is secured between the outer 108 and inner 110 contact regions.

A portion (not shown) of the inner surfaces of the outer 118 and inner 120 central segments may be textured to improve grip. The portion (not shown) may be an entire portion. Preferred textures include checkered patterns, ribs, grooves, and dotted textures.

When a wearer uses the device 100 to put on the orthodontic aligner, the orthodontic aligner can be pushed upwards into the teeth (or the wearer can bite down on the orthodontic aligner), allowing a wearer to fit the orthodontic aligner exactly over his or her teeth.

Figure 4A:
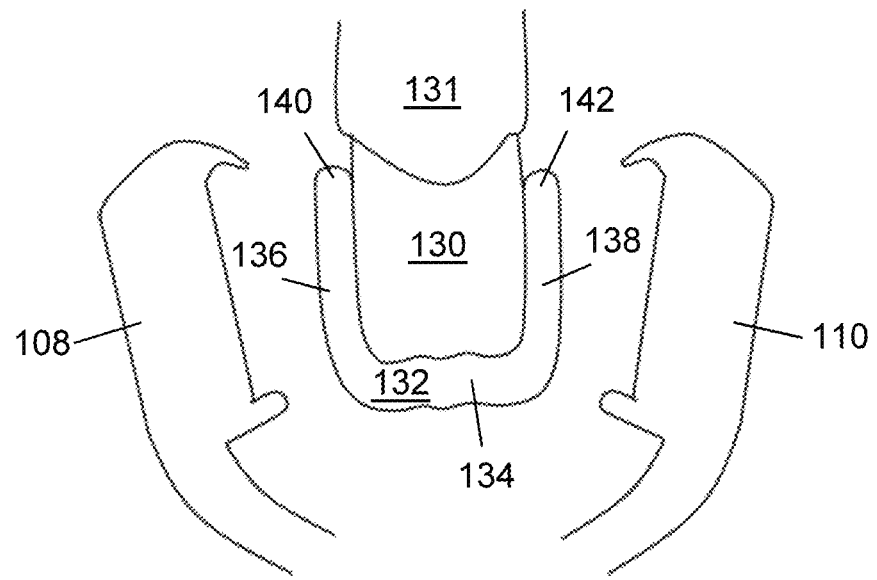
FIGS. 4a-4c show a method of removing an orthodontic aligner.
Figure 4B:
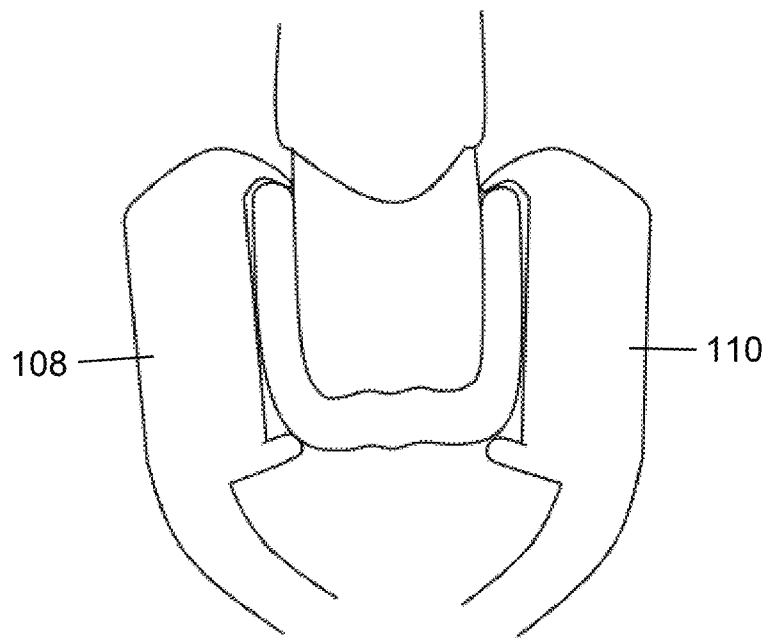
Figure 4C:
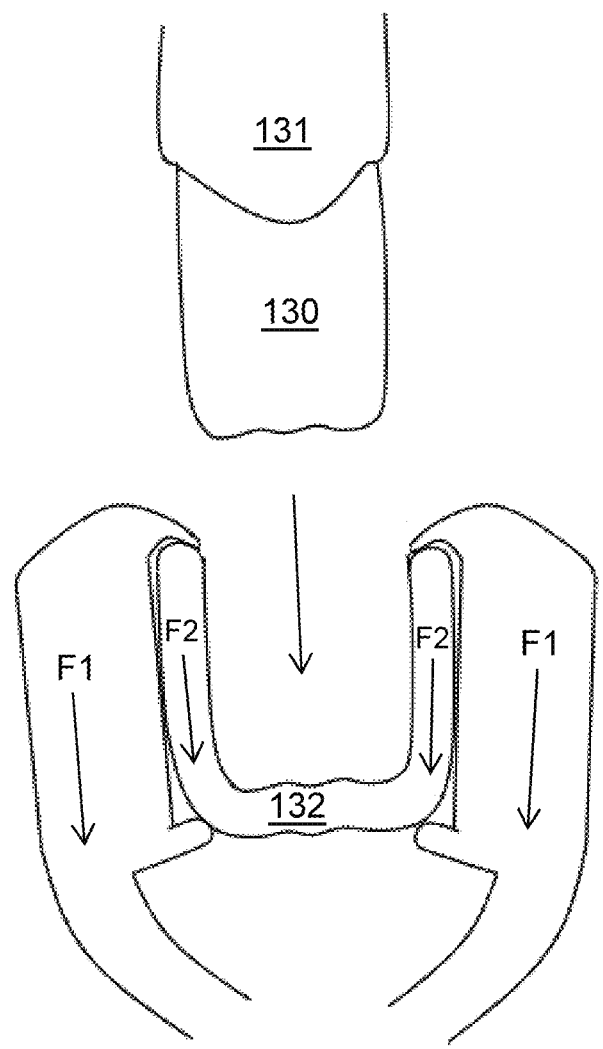

FIGS. 4a-4c show a method of removing an orthodontic aligner 132 using the device 100, according to an embodiment.

The term orthodontic aligners 132, as used throughout this disclosure, refers to dental devices designed to adjust and straighten teeth without the use of traditional braces. Orthodontic aligners include, but are not limited to:

Clear aligners that are made of a rigid or semi-rigid material and custom-fitted to the patient's teeth. Brands like Invisalign, ClearCorrect, and SmileDirectClub are well-known producers of clear aligners. They are virtually invisible, removable for eating and cleaning, and are replaced every few weeks to gradually move the teeth into the desired position.

Retainers that are used to maintain teeth positions after treatment with braces or aligners, some retainers are designed to make minor adjustments to the teeth's alignment. These can be clear, like aligners, or made of wire and acrylic.

Night-only aligners that are designed to be worn only at night. They may take longer to achieve results compared to all-day aligners but are marketed towards those looking for a more convenient treatment option.

FIG. 4a shows a cross-sectional view of the orthodontic aligner 132 over a tooth 130. It should be noted that orthodontic aligners 132 are worn over many teeth. However, only one tooth 130 and gums 131 are illustrated for clarity purposes. A user has caused the first 108 and second 110 contact regions to move apart from each other (e.g., by tweezing the device 100) and has positioned the first 108 and second 110 contact regions around the orthodontic aligner 132.

FIG. 4b shows a cross-sectional view of the orthodontic aligner 132 secured in between the first 108 and second 110 contact regions. The user has caused the first 108 and second 110 contact regions to approach each other (e.g., by un-tweezing the device 110), securing the orthodontic aligner 132 in between the first 108 and second 110 contact regions.

FIG. 4c shows a cross-sectional view of the orthodontic aligner 132 removed from the tooth 130. The user has applied a downwards force F1 to the first 108 and second 110 contact regions (e.g., by pulling the device 100 downwards), which, in turn, applied a downwards force F2 to the orthodontic aligner, dislodging it from the tooth 130. Optionally, the method may end when the user places the removed orthodontic aligner 132 into a container or a cleaner for the orthodontic aligner 132.

Figure 5:
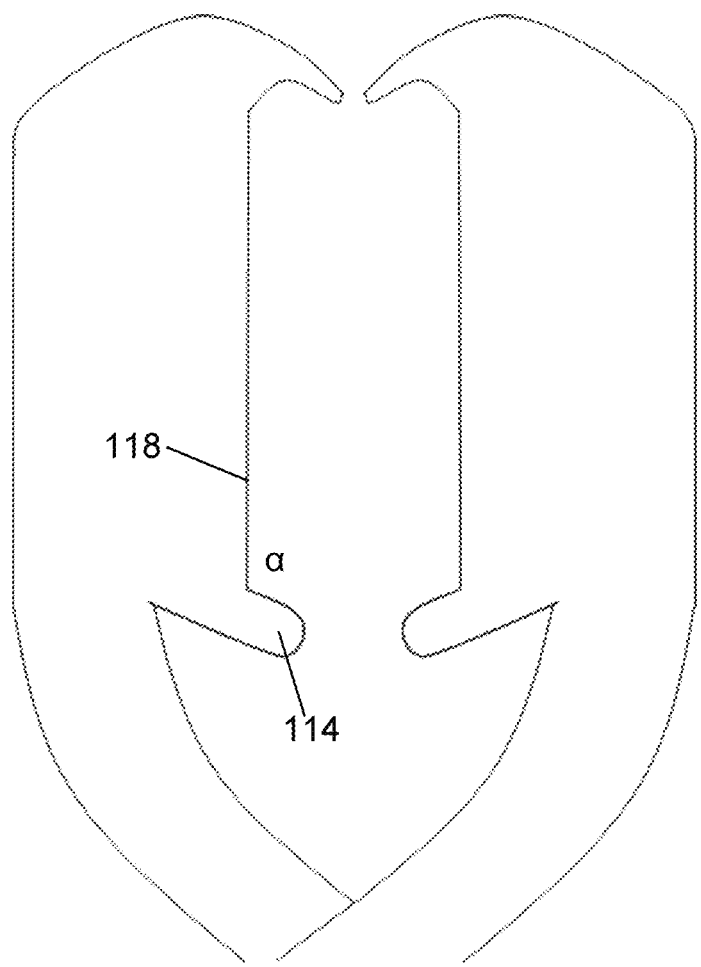
FIG. 5 is an enlarged view of an alternative set of contact regions.

FIG. 5 is an enlarged view of the outer 108 and inner 110 contact regions of the device 100, according to another embodiment. The angle (a) between inner surfaces of the outer 114 and inner 116 extensions, and inner surfaces of the respective outer 118 and inner 120 central segments, may be obtuse, preferably 100-160 degrees.

Figure 6:
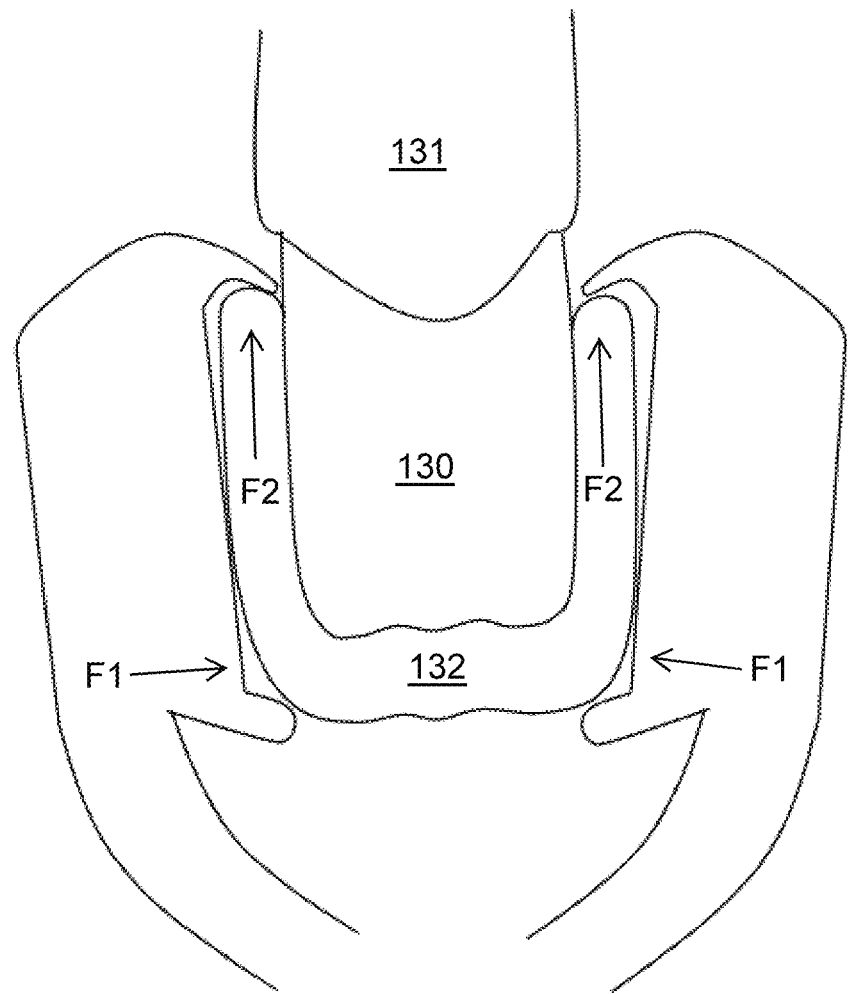
FIG. 6 shows the forces applied to the orthodontic aligner when the contact regions of FIG. 5 are caused to approach each other.

FIG. 6 shows the forces applied to the orthodontic aligner when outer 108 and inner 120 contact regions, having an obtuse angle (a), are caused to approach each other. The outer 108 and inner 120 contact regions are approaching each other with a horizontal force F1. The outer 114 and inner 116 extensions redirect the horizontal force F1 into a vertical force F2, which, when applied to the orthodontic retainer 132, cause the outer 140 and inner 142 ridges of the orthodontic retainer 132 to be held more securely within the recessed areas 126.

Figure 7:
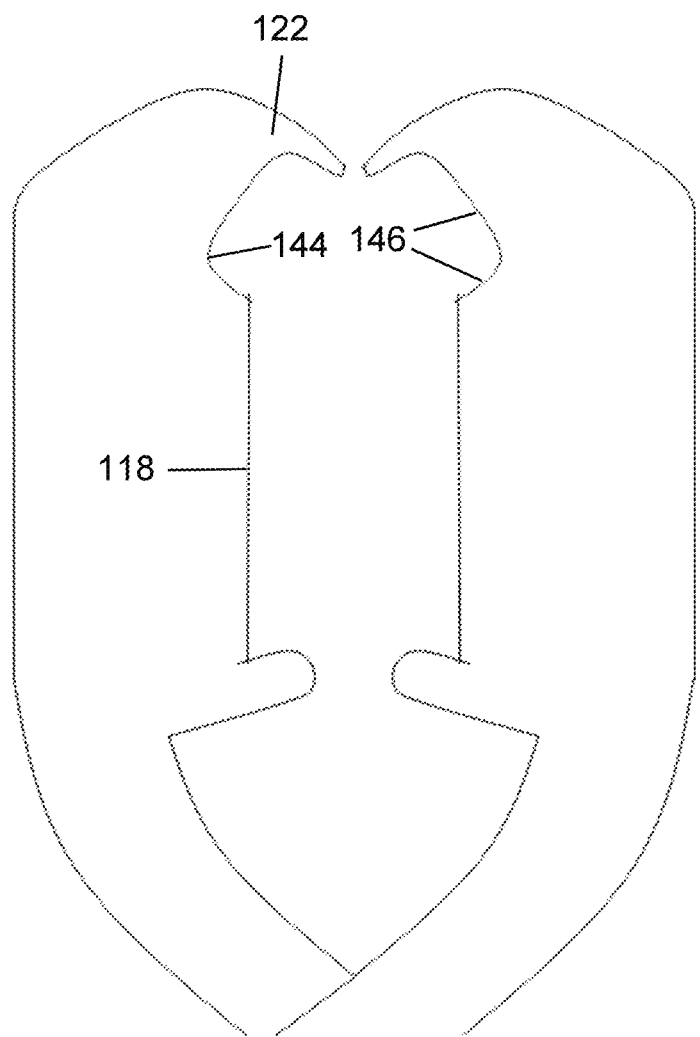
FIG. 7 is an enlarged view of an alternative set of contact regions.

FIG. 7 is an enlarged view of the outer 108 and inner 110 contact regions of the device 100, according to another embodiment. Inner surfaces of the outer 118 and inner 120 tips have recessed areas 144. When a plate portion 148 of the orthodontic aligner is positioned inside one of the recessed areas, pitching motion of the orthodontic aligner is further restricted. Curvatures of the inner surfaces include sloped segments 146 configured to guide the plate portion 148 of the orthodontic aligner into one of the recessed areas 144 during the process of securing the orthodontic aligner 132 in between the outer 108 and inner 110 contact regions.

Figure 8:
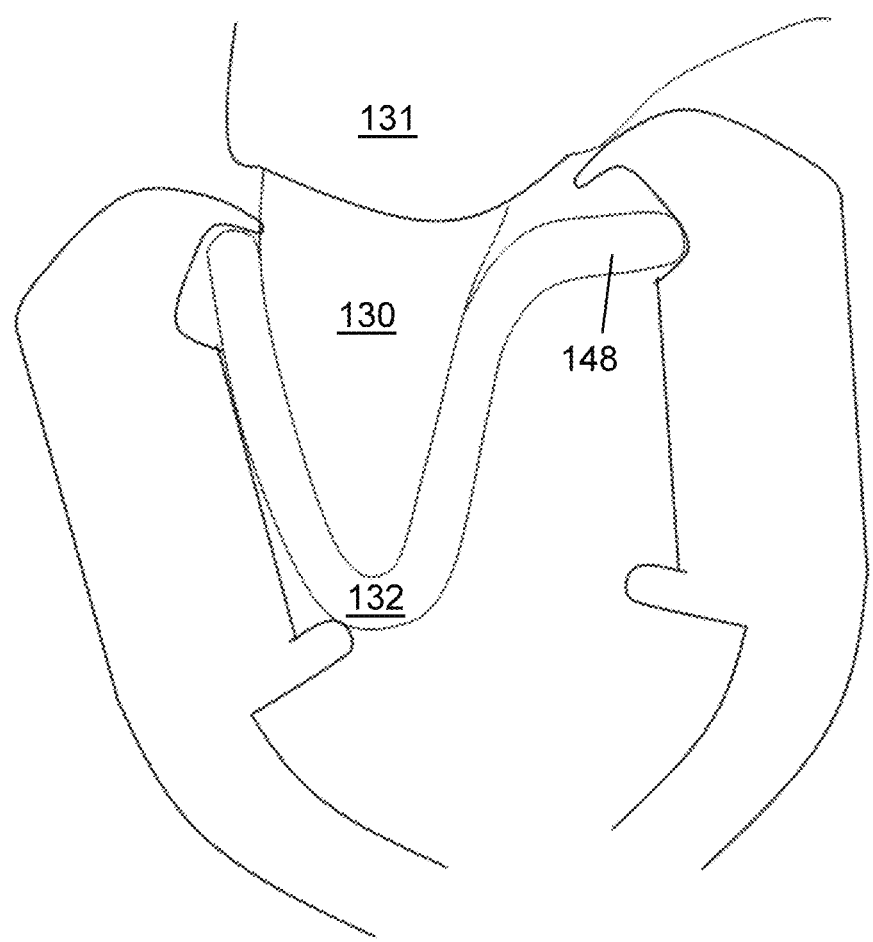
FIG. 8 shows an orthodontic aligner secured in between the contact regions of FIG. 7.

FIG. 8 shows an orthodontic aligner 132 secured in between the outer 108 and inner 110 contact regions having recessed areas 144. The back edge of the plate portion 148 of the orthodontic aligner 132 rests in the recessed area of the inner central segment.

While specific devices and methods to remove an orthodontic aligner have been contemplated, it would be readily appreciated by those in the field that the components of the device, individually, or in any combination, may be incorporated into tools used for other orthodontic procedures.

I claim:

1. A device for removing an orthodontic aligner, the device comprising:
   a hinge to enable a tweezing motion of the device;
   a first leg and a second leg coupled to the hinge;
   an outer contact region positioned at a distal end of the first leg;
   an inner contact region positioned at a distal end of the second leg;
   wherein the orthodontic aligner is secured in between the outer and inner contact regions when the outer and inner contact regions are caused to approach each other;

a set of tips, extending out of distal ends of the outer and inner contact regions, face each other and are configured to contact inner and outer ridges of the orthodontic aligner;

a set of extensions, extending out of proximal ends of the outer and inner contact regions, face each other and are configured to contact the base of the orthodontic aligner; and central segments of the contact regions, in between the tips and the extensions, are configured to contact the inner and outer walls of the orthodontic aligner.

2. The device of claim 1, wherein
a distance between the tips and the extensions is equal to a height of the orthodontic aligner.

3. The device of claim 1, wherein
the central segments have flat inner surfaces.

4. The device of claim 1, wherein
inner surfaces of the central segments are textured.

5. The device of claim 1, wherein
each of the tips has a recessed area; and
a curvature of each of the tips includes sloped segments configured to guide the inner and outer ridges of the orthodontic aligner into the recessed areas during the process of securing the orthodontic aligner in between the outer and inner contact regions.

6. The device of claim 1, wherein
an angle in between the extensions and inner surfaces of the central segments is acute.

7. The device of claim 1, wherein
an angle in between the extensions and inner surfaces of the central segments is obtuse such that the extensions push the orthodontic aligner into receded areas in the tips during the process of securing the orthodontic aligner in between the outer and inner contact regions.

8. The device of claim 1, wherein
each of the central segments has a recessed area.

9. The device of claim 8, wherein
the recessed areas are adjacent to the tips.

10. The device of claim 1, wherein
outer surfaces of the first and second legs are textured.

11. A device for removing an orthodontic aligner, the device comprising:
a hinge to enable a tweezing motion of the device;
a first leg and a second leg coupled to the hinge;
an outer contact region positioned at a distal end of the first leg;
an inner contact region positioned at a distal end of the second leg;
wherein
a set of tips, extending out of distal ends of the outer and inner contact regions, face each other and are configured to contact inner and outer ridges of the orthodontic aligner;
a set of extensions, extending out of proximal ends of the outer and inner contact regions, face each other and are configured to contact the base of the orthodontic aligner; and
central segments of the contact regions, in between the tips and the extensions, are configured to contact the inner and outer walls of the orthodontic aligner;
the outer and inner contact regions are caused to move apart from each other when a user applies pressure to the first and second legs;
the first and the inner contact regions are caused to approach each other when a user stops applying pressure to the first and second legs;
the orthodontic aligner is secured in between the outer and inner contact regions when the outer and inner contact regions are caused to approach each other;
a distance between the tips and their corresponding extensions is equal to a height of the orthodontic aligner.

12. The device of claim 11, wherein
inner surfaces of the central segments are textured; and
outer surfaces of the first and second legs are textured.

13. The device of claim 11, wherein
each of the tips has a recessed area; and
a curvature of each of the tips includes sloped segments configured to guide the inner and outer ridges of the orthodontic aligner into the recessed areas during the process of securing the orthodontic aligner in between the outer and inner contact regions; and
an angle in between the extensions and inner surfaces of the central segments is obtuse such that the extensions push the orthodontic aligner into the tips during the process of securing the orthodontic aligner.

14. The device of claim 11, wherein
each of the central segments has a recessed area.

15. The device of claim 14, wherein
the recessed areas are adjacent to the tips.

16. A method of removing an orthodontic aligner from teeth, the method comprising steps of:
providing a device, the device comprising:
a hinge to enable a tweezing motion of the device;
a first leg and a second leg coupled to the hinge;
an outer contact region positioned at a distal end of the first leg;
an inner contact region positioned at a distal end of the second leg;
a set of tips, extending out of distal ends of the outer and inner contact regions, face each other and are configured to contact inner and outer ridges of the orthodontic aligner;
a set of extensions, extending out of proximal ends of the outer and inner contact regions, face each other and are configured to contact the base of the orthodontic aligner
central segments of the contact regions, in between the tips and the extensions, are configured to contact the inner and outer walls of the orthodontic aligner
causing the outer and inner contact regions to move apart from each other when a user applies pressure to the first and second legs;
positioning the outer and inner contact regions around the orthodontic aligner;
causing the outer and inner contact regions to approach each other when a user stops applying pressure to the first and second legs such that the orthodontic
aligner is secured in between the outer and inner contact regions; and
dislodging the orthodontic retainer from the teeth.

17. The method of claim 16, wherein
the central segments have a recessed area adjacent to the tips.

18. The method of claim 16, further comprising a step of:
pushing the orthodontic retainer into the teeth when the orthodontic aligner is secured in between the outer and inner contact regions.

* * * * *